(12) United States Patent
Griffiths et al.

(10) Patent No.: US 8,084,712 B2
(45) Date of Patent: Dec. 27, 2011

(54) METHOD AND APPARATUS FOR LASER MARKING OBJECTS

(75) Inventors: Michael John Griffiths, Boulder, CO (US); Yancy Edward Fox, Louisville, CO (US)

(73) Assignee: TEN Medias LLC, Beverly Hills, CA (US)

( * ) Notice: Subject to any disclaimer, the term of this patent is extended or adjusted under 35 U.S.C. 154(b) by 1291 days.

(21) Appl. No.: 11/725,099

(22) Filed: Mar. 16, 2007

(65) Prior Publication Data

US 2008/0223834 A1    Sep. 18, 2008

(51) Int. Cl.
*B23K 26/00* (2006.01)

(52) U.S. Cl. ............ 219/121.68; 219/121.69; 700/166

(58) Field of Classification Search ............ 219/121.68, 219/121.69; 347/224, 225, 233
See application file for complete search history.

(56) References Cited

U.S. PATENT DOCUMENTS

| | | |
|---|---|---|
| 1,906,094 A | 4/1933 | Powell |
| 3,094,920 A | 6/1963 | Priesmeyer |
| 3,665,148 A * | 5/1972 | Yasenchak et al. ........ 219/124.4 |
| 3,779,159 A | 12/1973 | Rose et al. |
| 3,916,143 A | 10/1975 | Farrell |
| 4,043,105 A | 8/1977 | Cochran |
| 4,578,329 A | 3/1986 | Holsappel |
| 4,636,043 A | 1/1987 | Bellar |
| 4,652,722 A * | 3/1987 | Stone et al. ............ 219/121.76 |
| 4,659,902 A * | 4/1987 | Swensrud et al. ........ 219/121.78 |
| 4,839,181 A | 6/1989 | MacMurray et al. |
| 4,843,958 A | 7/1989 | Egosi |
| 4,900,617 A | 2/1990 | Smith |
| 5,021,631 A | 6/1991 | Ravellat |
| 5,120,631 A | 6/1992 | Kanbayashi et al. |
| 5,120,928 A | 6/1992 | Piliero |
| 5,142,976 A | 9/1992 | Roulleau |
| 5,164,009 A | 11/1992 | Chandler |
| 5,198,843 A | 3/1993 | Ito et al. |
| 5,262,470 A * | 11/1993 | Shimotsuma et al. ........ 524/496 |
| 5,316,397 A | 5/1994 | Robertson et al. |
| 5,335,003 A | 8/1994 | Sugden |
| 5,477,179 A | 12/1995 | Takada et al. |
| 5,478,990 A | 12/1995 | Montanari et al. |

(Continued)

FOREIGN PATENT DOCUMENTS

DE           3601913           7/1987

(Continued)

OTHER PUBLICATIONS

Machine translation of Japan Patent document JP-2000-168,157, May 2010.*

(Continued)

*Primary Examiner* — Geoffrey S Evans

(74) *Attorney, Agent, or Firm* — Wolf, Greenfield & Sacks, P.C.

(57) ABSTRACT

Methods and apparatus for laser marking individual objects with indicia at a marking station wherein a predetermined window exists during which each object can be marked as the objects are conveyed along at least one path at a predetermined speed. In some embodiments, at least first and second lasers positioned adjacent one or more paths are configured to direct a laser beam onto the objects to mark the same with indicia as the objects pass through the marking station, with each of the first and second lasers marking alternate following objects as they pass through the marking station.

39 Claims, 9 Drawing Sheets

U.S. PATENT DOCUMENTS

| | | | |
|---|---|---|---|
| 5,526,119 A | 6/1996 | Blit et al. | |
| 5,608,429 A | 3/1997 | Hayashihara et al. | |
| 5,646,765 A * | 7/1997 | Laakmann et al. | 359/202.1 |
| 5,653,900 A | 8/1997 | Clement | |
| 5,660,747 A | 8/1997 | Drouillard et al. | |
| 5,691,757 A | 11/1997 | Hayashihara et al. | |
| 5,734,412 A * | 3/1998 | Hasebe et al. | 347/247 |
| 5,767,477 A | 6/1998 | Sutter, Jr. | |
| 5,792,807 A | 8/1998 | Hayashihara et al. | |
| 5,798,843 A | 8/1998 | Yamamoto et al. | |
| 5,817,243 A * | 10/1998 | Shaffer | 216/65 |
| 5,897,797 A | 4/1999 | Drouillard | |
| 5,928,842 A | 7/1999 | Shinmoto et al. | |
| 6,018,135 A * | 1/2000 | Weick | 219/121.79 |
| 6,029,424 A | 2/2000 | McEvoy et al. | |
| 6,154,738 A | 11/2000 | Call | |
| 6,180,914 B1 * | 1/2001 | Jones et al. | 219/121.68 |
| 6,188,990 B1 | 2/2001 | Brook et al. | |
| 6,270,222 B1 * | 8/2001 | Herpst | 359/511 |
| 6,421,159 B1 | 7/2002 | Sutter et al. | |
| 6,429,889 B1 | 8/2002 | Murokh | |
| 6,546,304 B2 | 4/2003 | Thorvaldsson et al. | |
| 6,584,982 B1 | 7/2003 | Clay et al. | |
| 6,678,094 B2 | 1/2004 | Sator et al. | |
| 6,732,928 B1 | 5/2004 | Lawlor | |
| 6,791,592 B2 | 9/2004 | Assa et al. | |
| 6,796,241 B2 | 9/2004 | Catalan et al. | |
| 6,810,796 B2 | 11/2004 | Catalan et al. | |
| 6,829,000 B2 | 12/2004 | Assa et al. | |
| 7,096,221 B2 | 8/2006 | Nakano | |
| 7,575,770 B2 | 8/2009 | Garwood | |
| 2001/0030179 A1 | 10/2001 | Knieb et al. | |
| 2002/0011311 A1 | 1/2002 | Carignan et al. | |
| 2002/0179580 A1 | 12/2002 | Costin | |
| 2002/0226835 | 12/2002 | Costin | |
| 2003/0015507 A1 * | 1/2003 | Miller et al. | 219/121.68 |
| 2003/0080191 A1 | 5/2003 | Lubow et al. | |
| 2003/0206227 A1 | 11/2003 | Assa et al. | |
| 2003/0226835 A1 | 12/2003 | Bell | |
| 2004/0130612 A1 | 7/2004 | Assa et al. | |
| 2006/0012821 A1 | 1/2006 | Franklin et al. | |
| 2006/0138105 A1 | 6/2006 | Parker | |
| 2007/0086822 A1 * | 4/2007 | Sato | 400/129 |

FOREIGN PATENT DOCUMENTS

| | | |
|---|---|---|
| DE | 3722176 | 1/1989 |
| DE | 3836821 | 5/1990 |
| DE | 247831 | 4/1991 |
| DE | 0291471 A5 | 7/1991 |
| DE | 4125007 | 1/1993 |
| DE | 4322252 | 1/1995 |
| DE | 10109109 | 10/2001 |
| EP | 0421837 | 4/1991 |
| EP | 0684144 | 11/1995 |
| ES | 2033185 | 3/1993 |
| FR | 2654662 | 5/1991 |
| FR | 2621529 | 4/1999 |
| GB | 2131767 A | 6/1984 |
| JP | 55034966 | 3/1980 |
| JP | 58-090985 | 5/1983 |
| JP | 61206692 | 9/1986 |
| JP | 1108940 | 4/1989 |
| JP | 1196259 | 8/1989 |
| JP | 2-60552 | 3/1990 |
| JP | 3-138092 A * | 6/1991 |
| JP | 3-221290 A * | 9/1991 |
| JP | 3211068 | 9/1991 |
| JP | 5-146887 | 6/1993 |
| JP | 7011183 | 1/1995 |
| JP | 11-28588 A * | 2/1999 |
| JP | 2000-168157 | 6/2000 |
| JP | 2000-168157 A * | 6/2000 |
| JP | 2000168157 | 6/2000 |
| JP | 2000-263276 A * | 9/2000 |
| JP | 2001-136859 | 5/2001 |
| JP | 2001136859 | 5/2001 |
| JP | 03-290939 A | 10/2003 |
| JP | 2003-290939 A * | 10/2003 |
| JP | 2005-138169 A * | 6/2005 |
| WO | WO 01/56789 | 8/2001 |

OTHER PUBLICATIONS

Machine translation of Japan Patent document JP-2000-263,276, May 2010.*

Machine translation of Japana Patent document JP2003-290,939, May 2010.*

Yakov Horenstein, "How Lasers Could Print Ads on Food", Daily Mail, Mar. 4, 1999.

Greg Stiles, "Laser Labeling", Mail Tribune, Sep. 19, 2004.

Durand-Wayland Labeling Systems, http://www.durand-wayland.com/label./8/7/2006.

European Search Report from related application, PCT/US 08/03160, mailed Aug. 12, 2008.

New Zealand Examination Report for Patent Application No. 580448 dated Feb. 24, 2011.

Singapore Written Opinion for Singapore Patent Application No. 200906160-7, dated Oct. 28, 2010.

Translation of Akio Iwasa, JP2001-136,859, Aug. 2010.

Translation of Tanio Shisei et al (JP-61-206692), Aug. 2010.

Translation of Gartzen et al. (DE4322252), Aug. 2010.

Translation of Mitsuo Yamada et al. (JP-2000-168157), Aug. 2010.

* cited by examiner

METHOD AND APPARATUS FOR LASER MARKING OBJECTS

BACKGROUND OF THE INVENTION

The present invention relates to laser systems and particularly a method and apparatus for laser marking objects at high speed.

It is known that food and medicinal products that are susceptible to spoilage or effectiveness often have a use by or expiration date that is printed on the items themselves or on the packaging of the items so a purchaser or potential user of the goods can make a judgment of whether the product is current or outdated. This is particularly important for some food products, which can become dangerous, with chicken eggs being a prime example because of the threat of salmonella poisoning.

It is for that reason that eggs are commonly packed in cartons that have expiration dates printed on the carton. A problem with this type of dating is that consumers often remove the eggs from a carton and put them in a special holders of their refrigerator and therefore lose the important expiration date information. Although it is not believed to be a widespread practice, there have been instances where establishments have removed eggs from one printed carton and placed in another having a later expiration date which can lead to usage beyond the date by which salmonella bacteria can develop into a dangerous condition. While there have been attempts to print expiration dates on the eggs themselves with ink jet printing or other type of marking, the permanency of such printed information is suspect and can often be removed.

A particularly desirable way in which to mark eggs is to use a laser to etch an expiration date and other information on the shell of the egg which results in a permanent marking that cannot be removed from the egg itself. Such marking is described in a patent application entitled METHOD AND APPARATUS FOR MARKING AN EGG WITH AN ADVERTISEMENT, A FRESHNESS DATE AND A TRACEABILITY CODE, having Ser. No. 11/333,580, filed Jan. 17, 2006, which is specifically incorporated by reference herein.

Because billions of eggs are produced annually in the United States alone, marking even a fraction of such numbers of eggs is a formidable undertaking. A large majority of eggs sold in the United States are produced in only a few hundred locations. At these locations, grader systems clean, candle, grade and pack eggs in large volumes. High volume grader systems generally have from two to six rows of eggs that are conveyed through the various stages of the grading system and can currently process up to 175,000 eggs an hour.

Since marking of eggs must be done during this grading process to be economical, it is necessary to mark the eggs very rapidly without slowing down the speed of operation of the grader system. Thus, the marking operation must necessarily occur within a very small time and physical size window. Because of time and physical size constraints, the amount and complexity of indicia that can be marked on the eggs is limited, and the laser marking apparatus must be sized to fit in the grader in a manner which does not interfere with the normal operation of the grader.

SUMMARY OF THE INVENTION

Embodiments of the present invention comprise an apparatus for laser marking individual objects with indicia at a marking station wherein a predetermined window exists during which each object can be marked as the objects are conveyed along at least one path at a predetermined speed, the apparatus comprising, at least first and second lasers positioned adjacent one or more paths configured to direct a laser beam onto the objects to mark the same with indicia as the objects pass through the marking station, with each of the first and second lasers marking alternate following objects as they pass through the marking station.

Various embodiments of the invention also comprise a method of laser marking individual objects while they travel along at least one path through a marking station at a preferably predetermined speed, comprising the steps of activating a first laser to begin marking a first object when it enters the marking station and continuing to mark the object through a first predetermined time window within the station, activating a second laser to begin marking a successive object when it enters the marking station and continuing to mark the successive object through a second predetermined time window within the station, the first and second predetermined time windows overlapping with one another so that both objects are being simultaneously marked for at least a portion of the length of the time windows.

PREFERRED EMBODIMENTS OF THE PRESENT INVENTION

Embodiments of the present invention are directed to apparatus as well as a method for laser marking objects as they pass through a marking station, with the marking being carried out by lasers that are designed and configured to render graphic representations as the objects pass through the marking station. While the objects may comprise many different sizes and forms, and may be made of many different types of materials, the objects that are of particular importance and are the subject of the present invention are eggs produced by chickens.

Parenthetically, it should be understood that terms "marking" or "etching" as used herein is intended to mean that a laser is employed as a radiant energy source. The laser beam is applied to leave most of the area of the eggshell unaffected so as to provide contrast between the unaffected areas and the marking. The laser beam ablates and melts the outer surface material from the egg shell. A significant benefit of the use of laser marking is that brown eggs have etched indicia that is a contrasting white color, while white eggs have etched indicia that is a contrasting dark brown color. The structural integrity of the egg shell is not affected because the etching by the beam only affects the outer approximately 50 to approximately 90 micrometers of the egg shell, which is approximately 5% to approximately 8% of the thickness of the egg shell.

Of the billions of eggs that are produced every year, the vast majority of them are produced in a rural facility, which often have hundreds of thousands of chickens which collectively produce more than a million eggs per day. These eggs are processed through grading systems that wash, grade, candle and pack the eggs at the facility, and which are then shipped to various destinations. The grading operation is carried out by high speed graders, some of which can handle up to 175,000 eggs per hour.

For this type of production to be maintained, an egg marking apparatus and method must be highly efficient to mark such numbers of eggs as they are processed through the grader. This is particularly true if a significant amount of indicia, such as graphic representations, is desired to be etched onto every egg. It may also be necessary to use multiple lasers if several lines of graphical representations are placed on each egg, and particularly if there are several rows of eggs. Not only that, if a complex graphical representation is marked on an egg, such as an intricate or extensive logo or design, for example, it is necessary to process the graphical representations in a manner whereby the graphic representation can be rendered on the egg with visual fidelity to the representation within the constraints of the physical and time window that exists for each egg that passes through a marking station.

Figure 1:
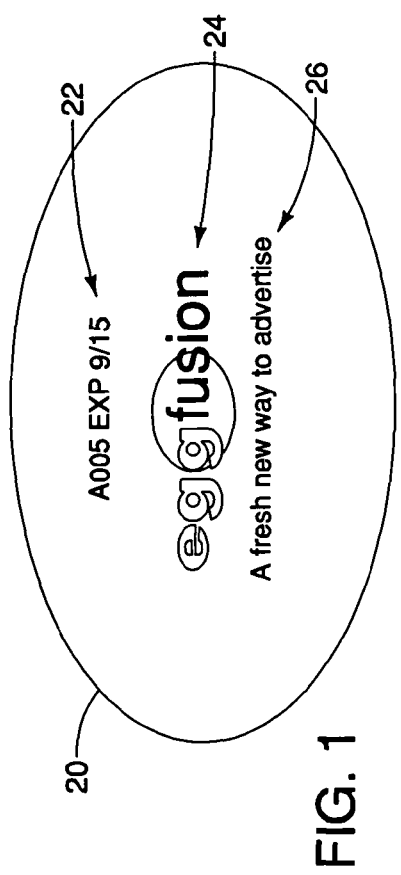
FIG. 1 is a plan view of an egg having graphical representations rendered thereon using a laser apparatus according to the present invention, which egg has a traceability code, an expiration date, a large pictorial representation of the word EGGFUSION with Logo features and a line of text indicating a fresh new way to advertise.

More particularly, and referring to FIG. 1, an egg 20 has an upper line 22 of graphic representation comprising text "A005 EXP 9/15", which is a traceability code followed by an expiration date. A middle line 24 contains a larger graphic representation of the word EGGFUSION with logo features and a bottom line 26 of text indicates a fresh new way to advertise. Another larger graphic representation is shown in FIGS. 11-14 which is a pictorial representation of the Disney® character Donald Duck that will be described in connection with vector technology.

Figure 2:
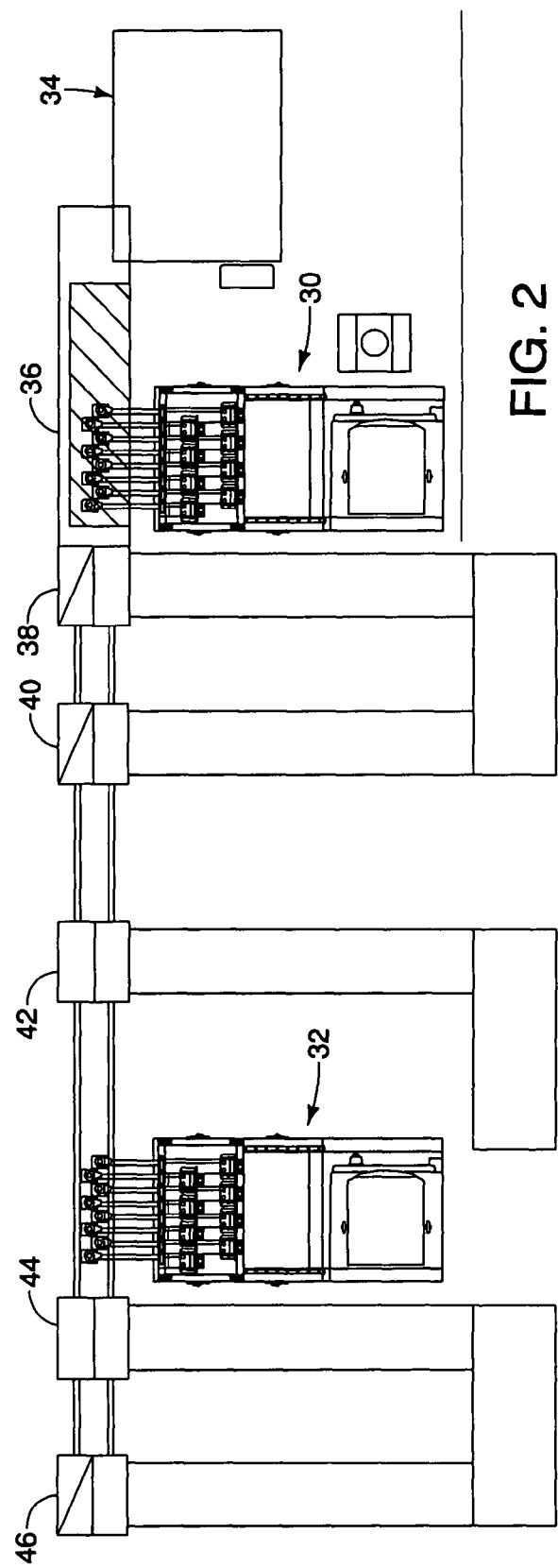
FIG. 2 is a plan view of a grader having apparatus embodying the present invention shown in two locations along the grader system.

Two different laser marking apparatus, indicated generally at 30 and 32, are shown in connection with a system that includes a grader 34 in FIG. 2. The grader 34 is positioned to receive eggs by a conveyor from buildings where hens are located and these eggs input to the grader 34 where they are candled, cleansed, graded and then transported by a conveying mechanism 36 where they are diverted at packing stations 38, 40, 42, 44 and 46, where they are packed in cartons for shipping. The two apparatus 30, 32 illustrated in FIG. 2 may represent alternate locations for a marking apparatus or they both may be provided to handle different rows of eggs of a multi-row conveyor, for example. In this regard, each of the apparatus 30, 32 shown in FIG. 2 are configured to mark two rows of eggs that are being moved through the grading system.

Figure 3:
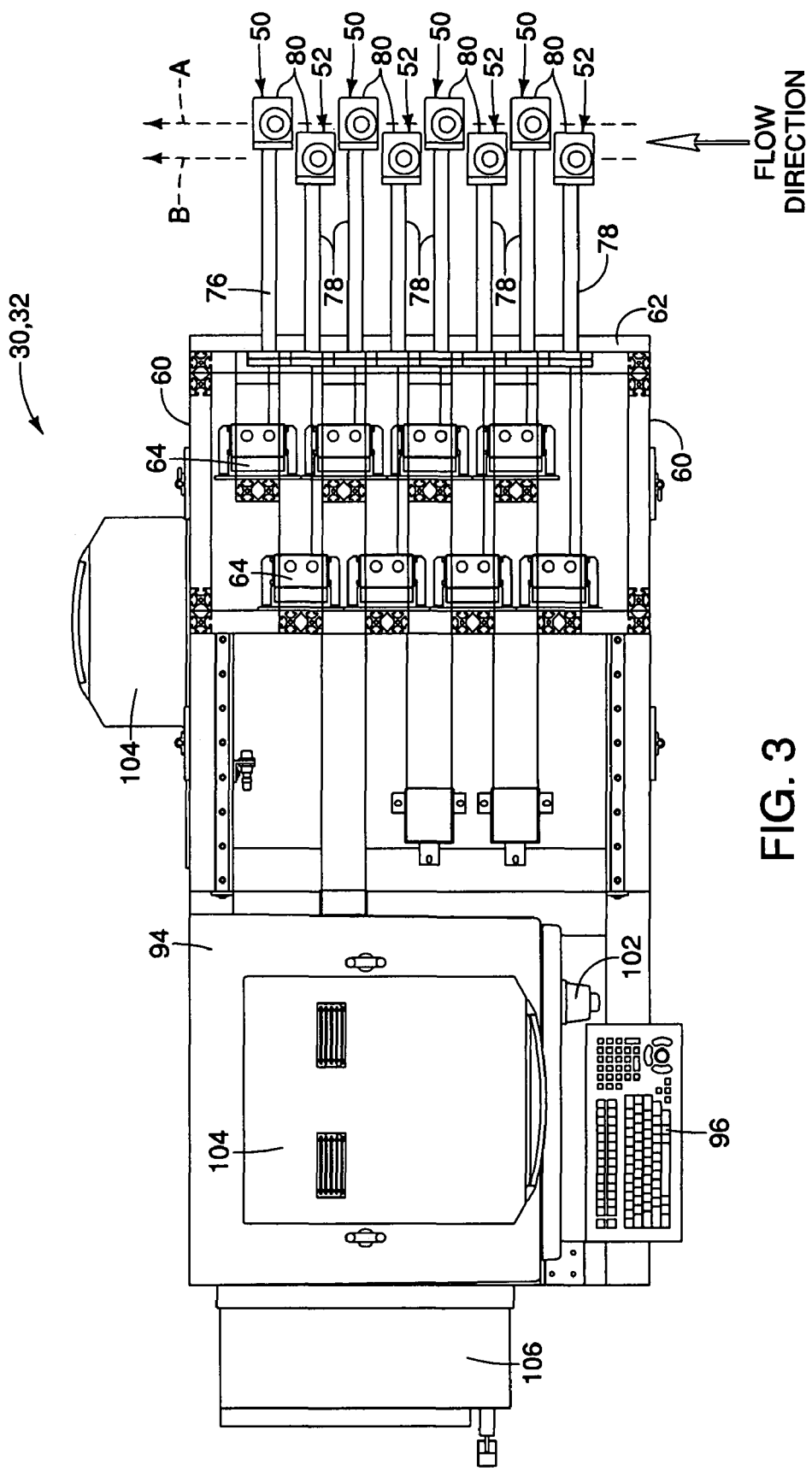
FIG. 3 is a plan view of the preferred embodiment of the laser marking apparatus embodying the present invention.
Figure 4:
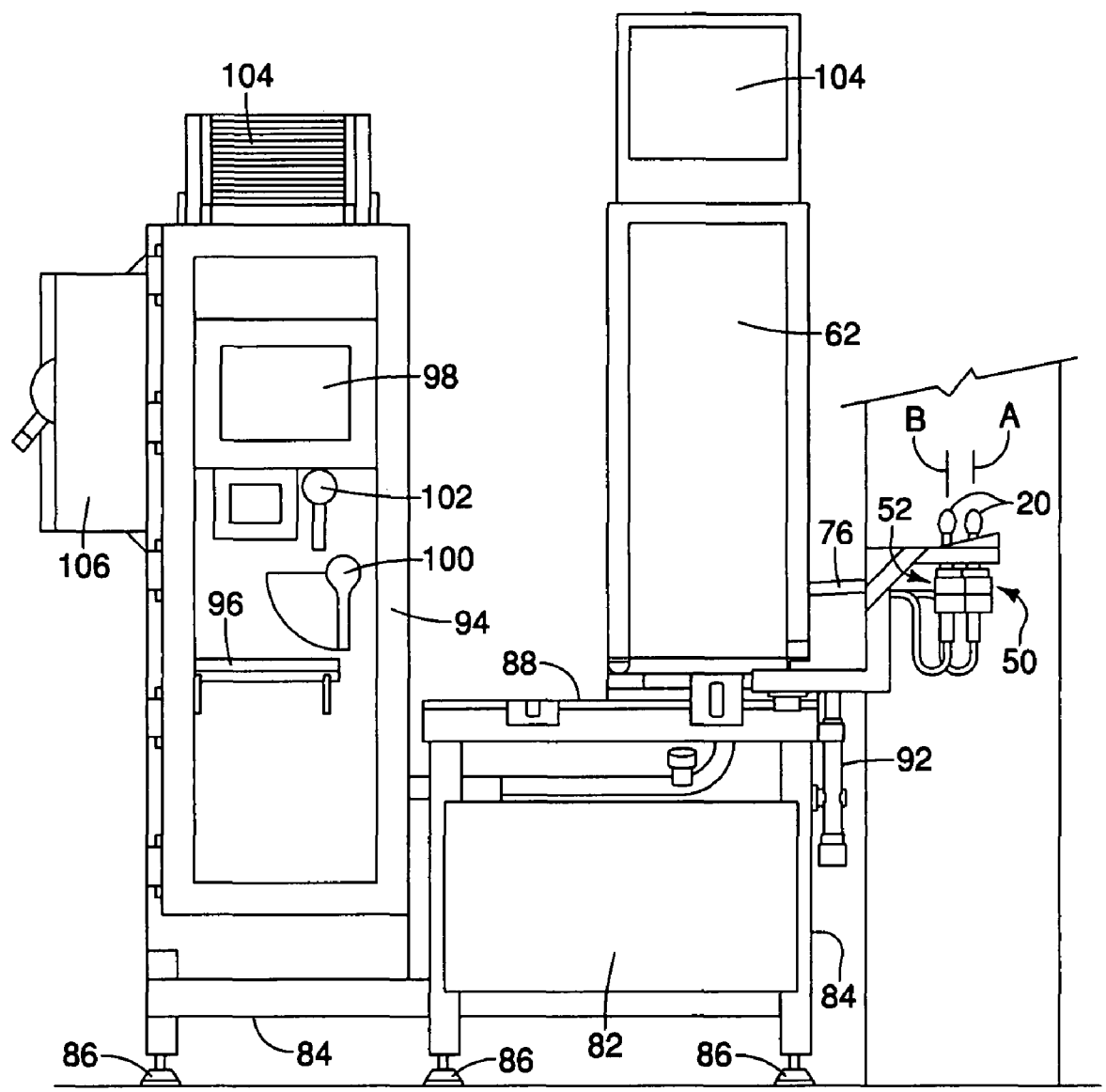
FIG. 4 is a side view of the apparatus shown in FIG. 3.

Since the movement of the eggs from the grader 34 is to the left, obviously the left marking apparatus 32 would not mark eggs that are diverted at packing stations 38, 40 and 42. Each of the apparatus 30, 32 has the capability of handling two rows of eggs A and B as shown in FIGS. 3 and 4.

Each of the marking apparatus 30, 32 are shown in FIGS. 3-10 and have four laser marking units, indicated generally at 50, for marking eggs in row A and four laser marking units, indicated generally at 52, for marking eggs in row B. The rows are shown by the lines marked A and B in FIGS. 3 and 4, with the eggs 20 shown in FIG. 4. The eggs 20 are carried by a conveyor indicated generally at 54 which has calipers 56 on opposite sides that hold the eggs as they are conveyed along a path of movement. The distance between successive eggs is defined as the pitch, which is preferably about 76 millimeters, but which can vary. In this regard, the pitch is determined by the grader manufacturer, to which laser marking apparatus is installed to mark the eggs. It is highly desirable not to slow the normal operation of the grader equipment, which conveys the eggs at a speed of up to about 1.1 meters per second.

Figure 10:
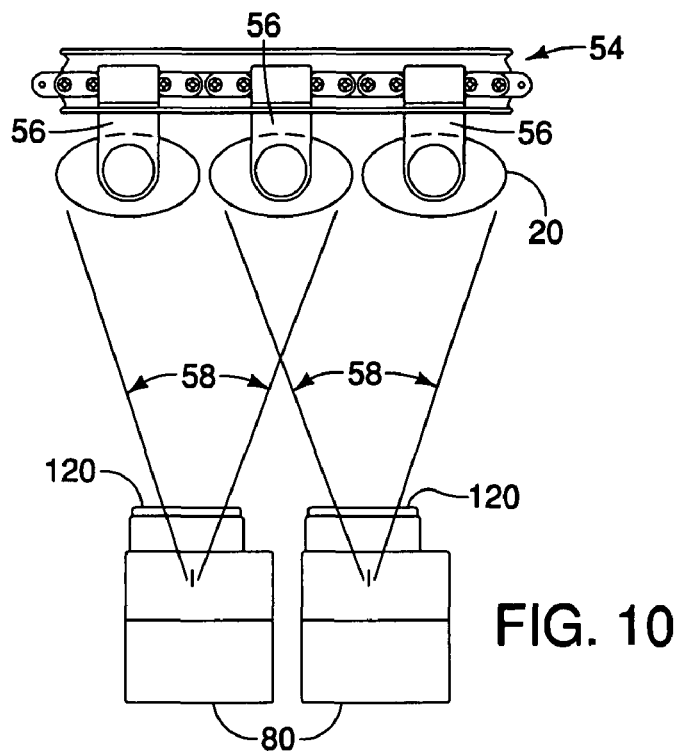
FIG. 10 is a simplified view illustrating a portion of a grader system conveying three eggs, together with two galvanometers and particularly illustrating the arc of movement of the laser beams.

At that speed, there is a time window of about 69 milliseconds for each laser marking unit to mark each successive egg that passes through the marking station, which means that 14 eggs are marked per second. In this regard, a marking station is defined as the distance along the conveying lines A and B wherein one or more of the laser marking units 50 and 52 can mark eggs, it being understood that the laser beam that is emitted from the units can be moved within an arc 58 having a range of about 30 to about 35 degrees as is generally indicated in FIG. 10. Thus, the marking station extends generally between the width of the apparatus defined by outer surfaces 60 of a laser marking unit enclosure 62 as shown in FIGS. 3-5.

Figure 6:
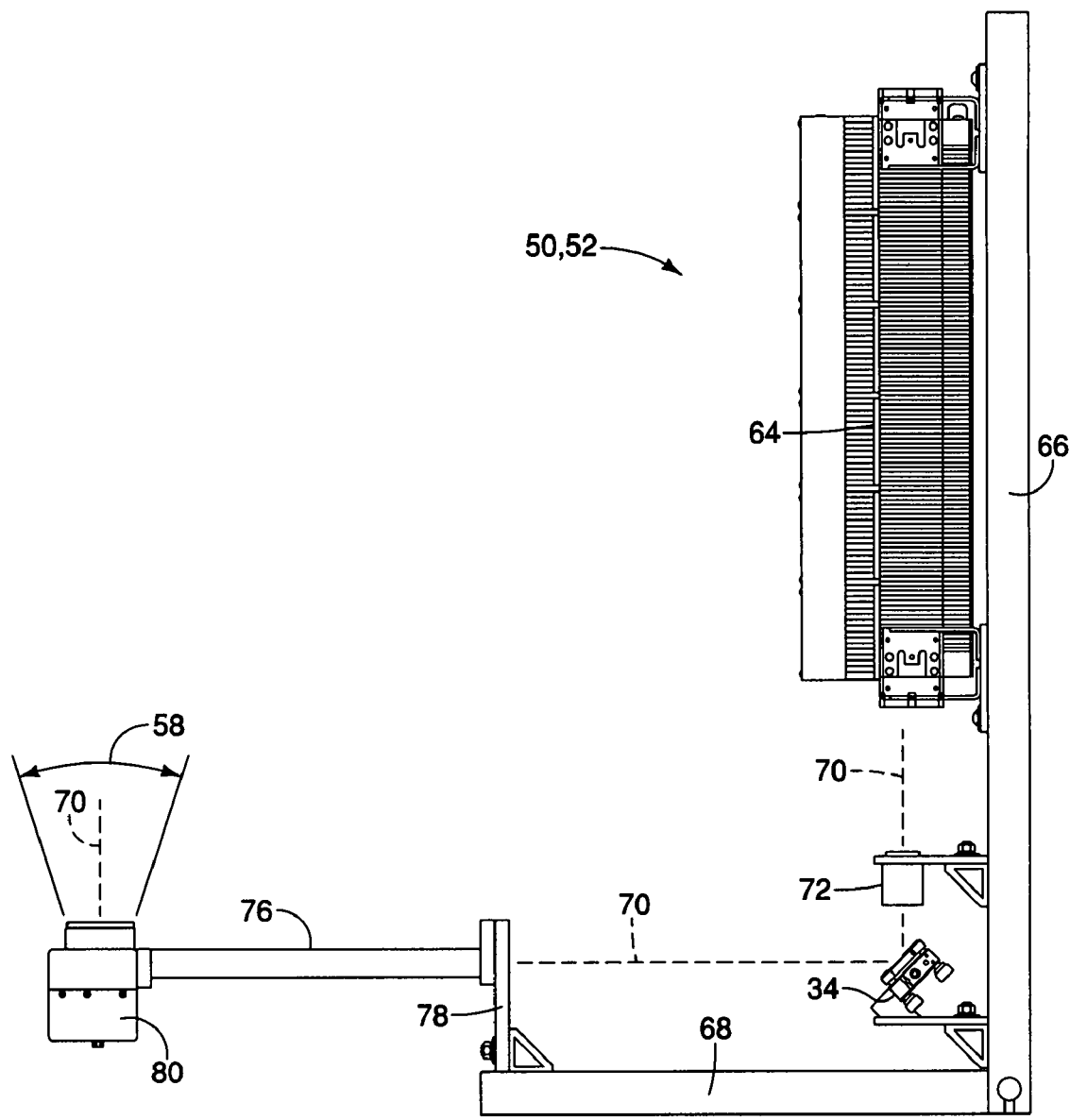
FIG. 6 is a side view of components of the apparatus shown in FIGS. 3-5, and particularly illustrating the laser generator and components for directing the generator laser beam to a galvanometer for directing the beam upwardly to mark eggs.

Turning now to the laser marking units 50, 52, and referring to FIG. 6, a laser generator 64 is mounted to a vertical structural support 66 that in turn is connected to a horizontal support 68. The laser generator 64 outputs a laser beam 70 that passes through a collimating and focusing lens 72, is then reflected off of mirror 74 and passes through a hollow support pipe 76 supported by a bracket 78 to a galvanometer scanning head 80 that directs the beam 70 upwardly to mark the eggs 20 as they pass by.

The laser generator 64 is preferably a $CO_2$ laser having approximately a maximum of about 70 watts of power, but which can be adjusted downwardly if desired. The galvanometer scanning head is preferably a SCANcube® 7 scan head having a digital standard interface controlled by a RTC® PC interface board or a PC independent RTC® SCANalone board as sold by the SCANLAB America, Inc. of Naperville, Ill. The scan head has a 7 millimeter aperture, a beam displacement of 9.98 mm, a dynamic performance tracking error of 0.14 msec, an optical performance skew of less than 6 mrad, a step response time at 1% of full scale of 0.25 ms, a typical marking speed of 2.5 m/sec, a typical positioning speed of 12.0 m/s and a typical good writing quality speed for single stroke characters of 1 millimeter height of 900 cps.

Figure 5:
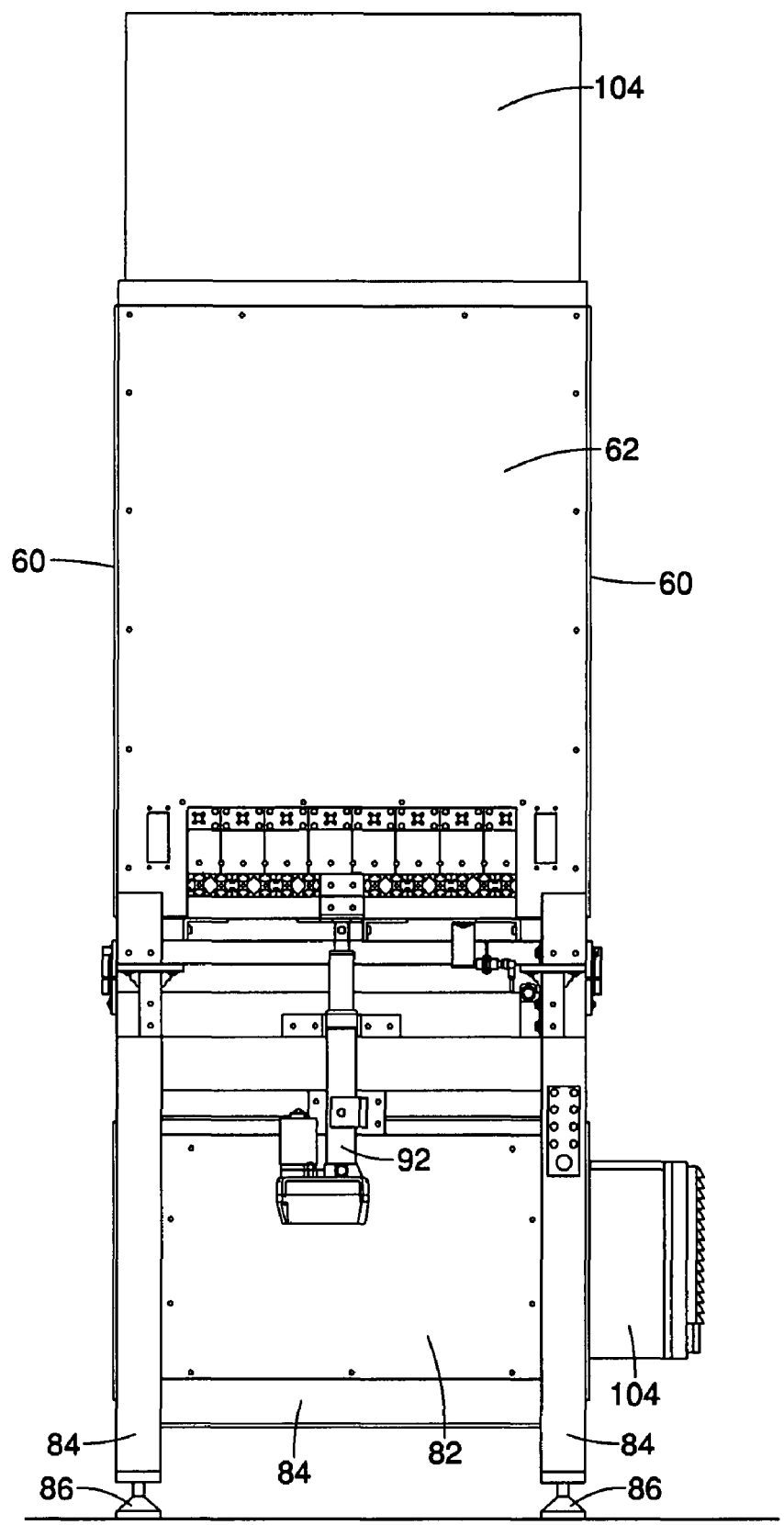
FIG. 5 is an end view of the apparatus shown in FIGS. 3 and 4.
Figure 9:
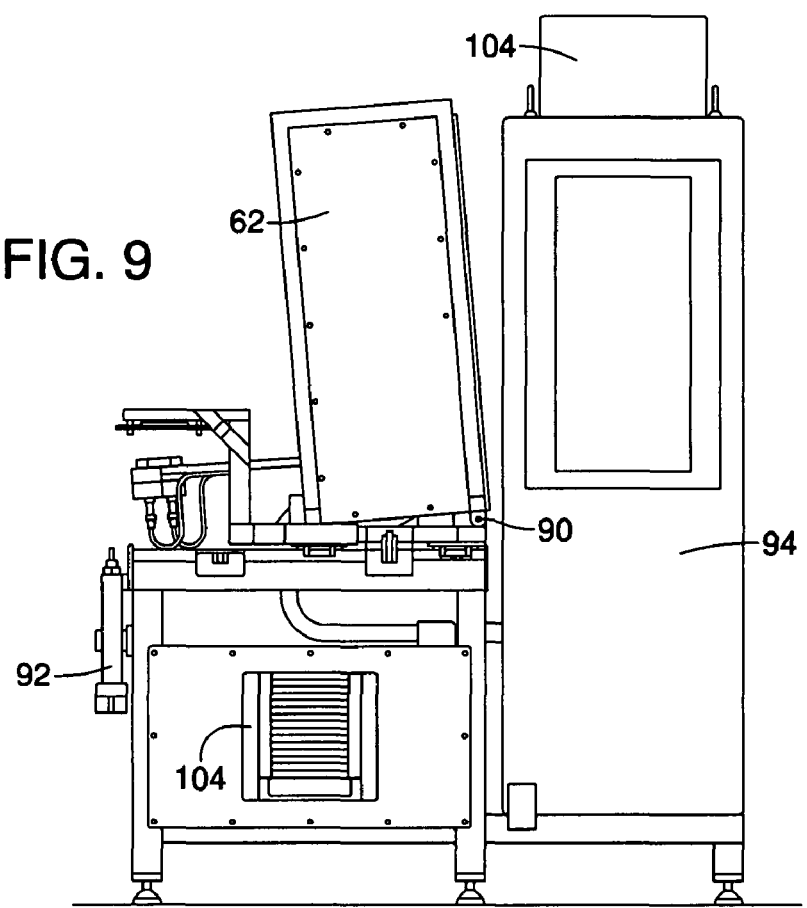
FIG. 9 is a side view illustrating the apparatus shown in FIGS. 3-5 wherein a portion of the apparatus is shown in a retracted and tilted position.

As shown in FIGS. 3-5, each of the laser marking units 50, 52 is mounted in the cabinet 62, with the laser generators 64 associated with units 50 being staggered relative to those associated with units 52 so more efficiently use space and keep all of the units in as small of a footprint as possible. The power supplies for the laser generators 64 are stored in a lower enclosure 82. A frame structure 84 has adjustable feet 86 for leveling and adjusting the elevation of the apparatus on the floor of an installation, and the frame structure has horizontal rail members 88 which carry the enclosure 62 and enable it to be moved from an operating position shown in FIGS. 3-5 to a retracted position as shown in FIG. 9.

The retracting capability enables the laser control units to be separated from the grader conveyor line 36 and serviced, without stopping the grader if necessary. Because of clearances, before it is retracted, it may be necessary to lower the galvanometer scanning heads 80 and this is accomplished by having pivot connections 90 on each side of the rear corner of the enclosure 62, and a tilt frame actuator assembly 92 on the front that can tilt the entire enclosure 62 which lowers the galvanometer scanning heads 80 so that the cabinet can be moved away from the conveyor 36.

Another enclosure 94 is mounted on the frame structure 84 which includes control and operating equipment, including program logic controllers, computers that also include RTC® PC interface boards for controlling the galvanometer scanning heads 80, modems for communicating with lap top computers as well as off site networking equipment that upload and download data relating to the operation of the equipment. The data files that define the graphic representations including those that provide vector coordinate information are generally downloaded from off-site networking, and the production information is uploaded for billing and other purposes. The computers are also interconnected with the computer system associated with the grader 34 that provides washer environmental information such as wash water temperature, rinse water temperature and wash water pH values. There are sensors that sense operating temperatures of the laser generators and of the galvanometer scanning heads 80, as well as current sensors for power supplies. Position sensors are also provided so that the operating status of all important moving components are monitored. The temperature and humidity within each of the enclosures is monitored.

An operator keyboard 96 and LCD display 98 are provided to enable on-site trouble shooting or maintenance work. However, during normal operation, and because of the extent of the monitoring and reporting that is done, the need for an on-site attendant is minimized for many types of maintenance work. If a problem arises, there are typically employees at the production facility that oversee the grader 34 operation among other activities that can use the keyboard 96 and display 98 while communicating with off-site personnel knowledgeable about the marking apparatus and rectify most problems. A laser marking unit power switch 100 is provided, as is an emergency stop switch 102. Because of the heat that is generated by the equipment, coupled with relatively high ambient temperature and humidity in such production facilities, air conditioning units 104 are provided for each enclosure. A main power disconnect panel 106 is located on the end of the apparatus.

Figure 7:
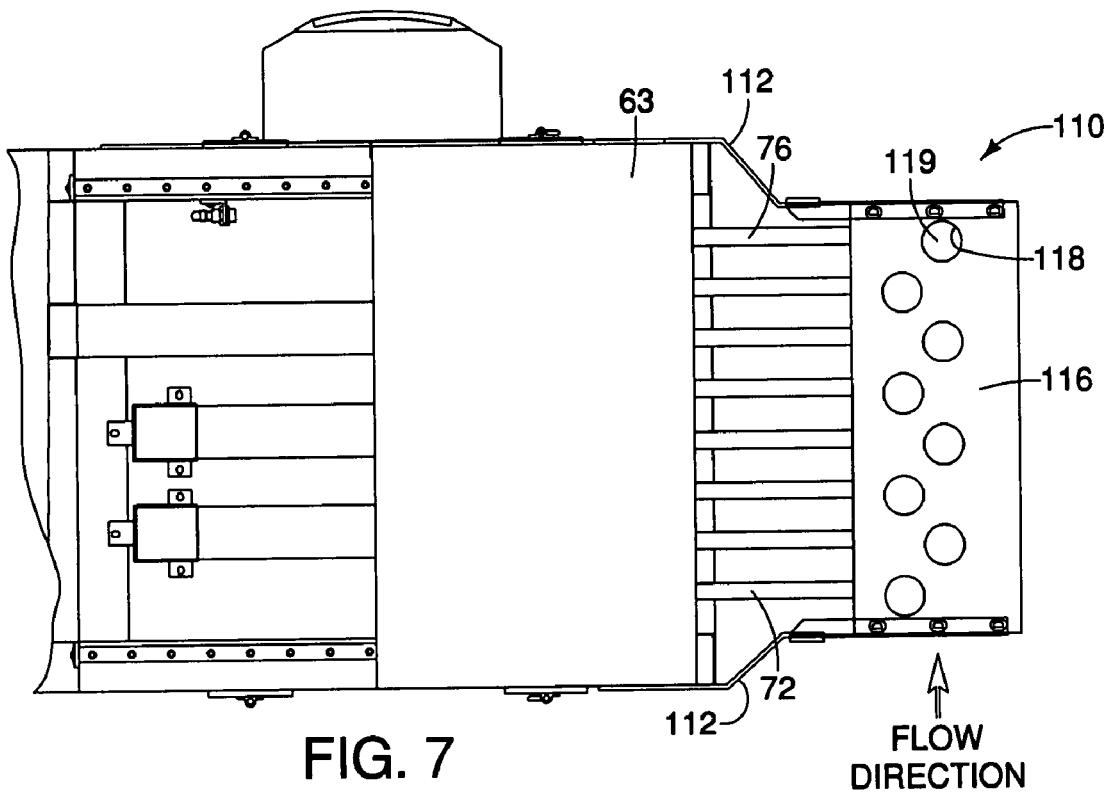
FIG. 7 is a top view of a portion of the preferred embodiment of the laser marking apparatus embodying the present invention, similar to FIG. 3, but illustrating the protective plate having apertures in which laser transmitting Germanium lenses are installed to keep debris and matter from falling on galvanometer scanning heads.

Because the galvanometer scanning heads 80 are located below the eggs 20, there is a likelihood that some eggs will be cracked and leaking or will otherwise be wet so that material will drop toward the galvanometer scanning heads 80 and impair their operation. To guard against such occurrences, a protective plate structure 110 shown in FIG. 7 is provided. It has left and right mounting legs 112 that are mounted to the frame members 88, and which carry horizontal support pipes 114, to which a plate 116 is attached. The plate has circular apertures 118 that are located above the galvanometer scanning heads 80 that have germanium protective lenses 119 covering the apertures so that matter from the eggs cannot pass through the apertures and fall onto the galvanometer scanning heads 80. The Germanium lenses are stronger than glass and have the property of passing a laser beam without distortion. Alternatively, zinc selenide lenses can be used inasmuch as this composition also passes laser light. Because the Germanium lenses are relatively expensive, the size of the apertures 118 is preferably only large enough so that the normal arc or range of movement of the laser beam can be made. To further prevent matter from entering the galvanometer scanning heads 80, a protective lens 120 is provided over the output of each head, as is indicated in FIG. 10.

Figure 8:
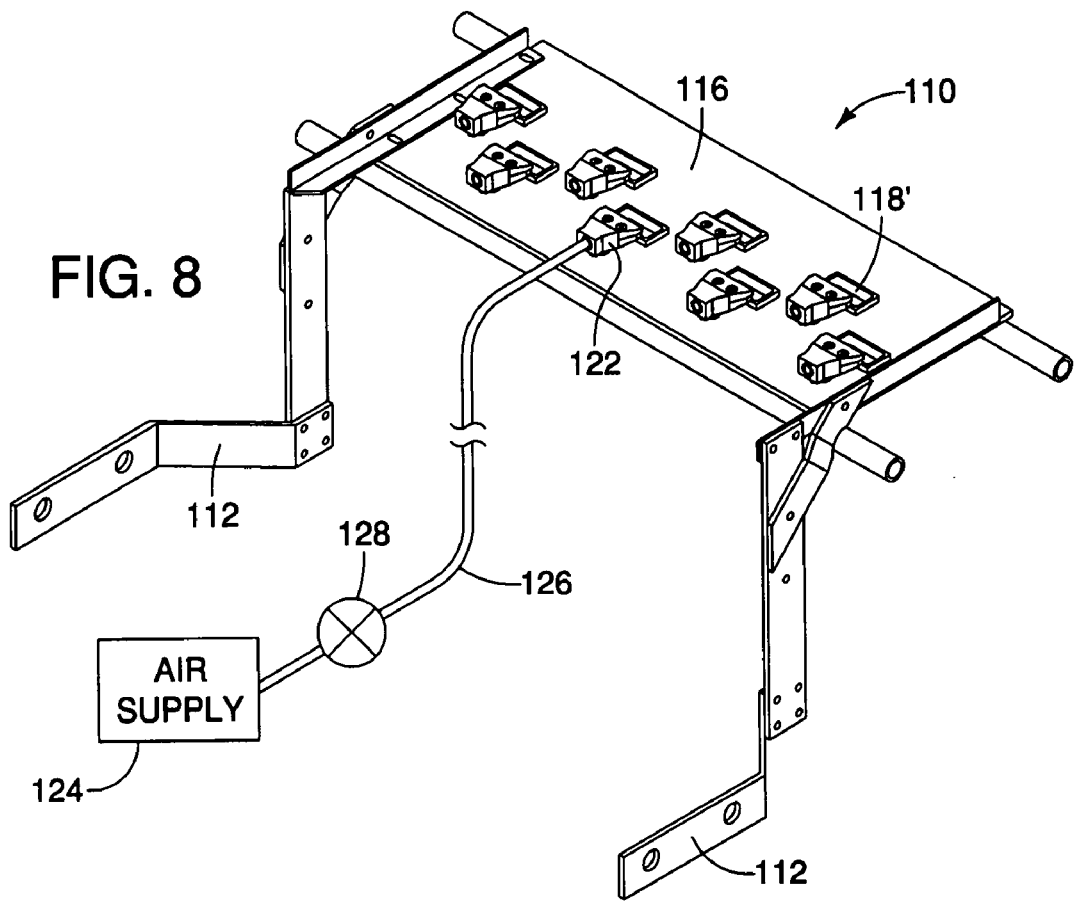
FIG. 8 is a perspective view of an alternative embodiment of a portion of the apparatus shown in FIGS. 3 and 4, and particularly illustrating a protective plate interposed between the galvanometers and the eggs that are conveyed above the plate together with air knives for preventing material from dropping onto the galvanometers.

An alternative embodiment is shown in FIG. 8, which has rectangular apertures 118' in the plate 116, with this embodiment having an air nozzle or knife 122 provided adjacent each aperture 118 that is connected to an air supply 124 through a series of hoses such as the hose 126 which directs a current of air over the apertures which blows dripping matter away so that it does not penetrate the apertures 118. Operation of the air knives 122 may be controlled by solenoid valves 128 in the hoses 126. A compressed air supply of at least 40 PSI at 50 CFM preferably powers the eight air knives 122 shown. Since the plate structure 110 is mounted to the stationary frame 84, the hoses 126 and other air supplying components should be separated from the laser marking units and the enclosure 62 because the latter can be retracted from the conveyor 36 as previously described, and the plate structure does not move.

With regard to laser marking eggs, a more powerful laser does not necessarily enable the speed to be increased. It takes time to transfer energy to get the right effect. For example, baking a potato generally takes about 45 minutes, and using a more powerful oven may explode the potato. There is also a power transfer function to an egg shell that produces the right effect on the egg. The laser generator is sometimes adjusted downwardly, so the maximum of 70 watts is not used. Wet eggs and soft eggs may require power nearer the upper value. Experience has shown that time is more valuable than power in marking eggs. It is for that reason that it is preferred to maximize the writing time of the particular graphic being written to the full 138 millisecond window (or 69 milliseconds for some of the lasers). The preferred optics produced by the lens 72 is 100 millimeters which produces width of the beam or spot size of about 0.3 millimeters. These optical characteristics also provide good depth of focus effect, which means that the eggs need not be the same size. Stated in other words, a 10 millimeter change caused by different size eggs does not matter because the focal point of the beam accommodates for such differences.

During operation, there are four laser marking units 50 or 52 marking eggs in each row, and the four units mark the upper, middle and bottom lines as shown in the egg 20 in FIG. 1. When the conveyor 54 moves at the speed of 1.1 meter per second, there is only about 69 milliseconds in which to mark each egg 20. As is evident from FIG. 1, the amount and size of a graphic representation that is being marked in the upper and bottom lines 22 and 26 is less than that in the middle line 24, which may be quite complex such as shown in FIGS. 11-15. The present apparatus uses two of laser marking units for marking the lines 22 and 26, and the two remaining lasers for marking the middle line on alternating eggs. This effectively doubles the time window from about 69 milliseconds to about 138 milliseconds with each of the two units marking every other egg. Using such an alternating procedure, more complex and extensive marking can be carried out in the middle line 24. Whereas the laser marking units 50 that mark the top and bottom lines 22 and 26 are operated during the 69 millisecond window to mark every egg as it comes along, the two laser marking units 50 that mark line 24 will each operate in 138 millisecond time windows which will overlapping with one another so that both laser marking units 50 will be simultaneously marking eggs for most of said 138 millisecond time window.

When an involved graphic representation is to be marked on an egg, it is accomplished by mapping a plurality of vectors on a physical grid that has a maximum size of about 20 millimeters by 40 millimeters. Referring to the graphic representation shown in FIG. 11, it is comprised of 572 vectors, such as vector 130 which has a start point 132 and an end point 134. Each of the start and end points have an X and a Y coordinate and each vector is a straight line.

The start and stop coordinates for every vector have to be programmed. This is generally done with an automatic conversion tool from web images that are used in various steps to produce a vector representation of the image. CorelDRAW® can be used, for example, which will produce a vector graphic representation from a bit graphic representation. However, the effectiveness of such tools may be sufficiently lacking that it is necessary to manually render certain types of graphics to obtain the right style of the graphic. The graphics can be provided in a PostScipt format, i.e., "pps" or "ps". Also there is a vector based plot file format called a ".plt" that can be used.

Generally, as the graphic representation moves through the time and spatial window, all of the lines on the left third are preferably completed as the middle third is being rendered, and similarly the middle third is rendered before the right third is rendered. This generally requires very long vectors to be segmented. The graphic is generally drawn from left to right, but the rendering is not strictly required. However, it is not be possible to render a vector beginning at the left edge of the graphic if most rendering is being performed at the right third of it. To achieve the above, the order of every vector must be programmed and becomes part of the electronic file of a graphic representation. The programming is done so that all of the vectors are specified consistent with these requirements.

Based on the fact that the eggs are moving at a predetermined speed and galvanometer parameters are known and/or set, such as turning on and turning off delay times, repositioning times, positioning speed, and the fact that only 70 milliseconds are available, the marking or writing speed is determined to render the image of the graphic based on those calculations and determine whether the representation can be effectively rendered. Since all of the vectors are known, together with the above parameters, it can be calculated at what speed the galvanometer scanning head 80 must write to complete the representation. Through experience, it has been found that approximately 200 vectors can be rendered in the 138 millisecond time window with acceptable quality. Because the physical size of the window on the egg is 20 millimeters by 40 millimeters, vectors can be removed without significantly detrimentally affecting the visual fidelity of the representation that is being rendered. The marking speed is preferably within the range of 400-800 bits per millisecond with an acceptable result being achieved at 800, a good result at 600 and a great result at 400. These units represent the coordinate space of 16 by 16 (0-65535 bits) that cover the 20 by 40 millimeter physical size of the window. The galvanometer scanning heads 80 can scan the entire field of 65535 bits in 65 milliseconds at a marking speed of 1000. Based on the optics described above, a marking speed of 1000 also translates to a distance of approximately 100 millimeters per millisecond. The quality of the mark can be affected by the quality of egg, so that a mark rendered on good eggs by the system at a particular set of parameters may be good, while those on poor eggs may not be.

Returning to FIG. 11, if all of the 572 vectors cannot be etched in the allotted time, the representation must be simplified by steps that include vector thinning and raster scanning to try to simplify the representation while maintaining realistic visual fidelity of the representation.

Vector thinning involves a process for simplifying the representation by reducing the number of vectors using an algorithm that is based on the Douglas Ramer Peucker algorithm for line simplification and generalization, which is used in digital cartography. The method for removing intermediate points, i.e., vectors, consists of joining the two ends of the line with a straight line, called the base line. The perpendicular distances of all intermediate points from this base line are then calculated. If all these distances are less than some predefined tolerance, representing half the width of the graphic line at source scale, these points may be discarded and the original line can be represented by the base line. If any of the intermediate points fall outside the tolerance band, the line is split into two parts at the furthest point and the process is repeatedly applied to the two resulting parts.

Raster scanning involves rasterizing all of the vectors onto a fixed grid that enables the determination of the existence of coincident points, which is a process for removing redundant coordinates. When points of two vectors are coincident with one another, one is preferably eliminated. The grid is defined and vectors are drawn on the grid from longest to smallest. If a new vector is drawn without changing any of the grid, that means it is on top of another, and the point or points of coincidence are removed by turning off the laser at those points. This is done by digital differential analysis. This raster thinning eliminates vector elements that provide no additional graphics artifacts. It is not technically a graphics grid, but is an internal memory grid. When vectors are rasterized from longest to smallest and when get to small vectors, if not shading new grid squares, then nothing is being added to the final rendering and they are eliminated.

Figure 15:
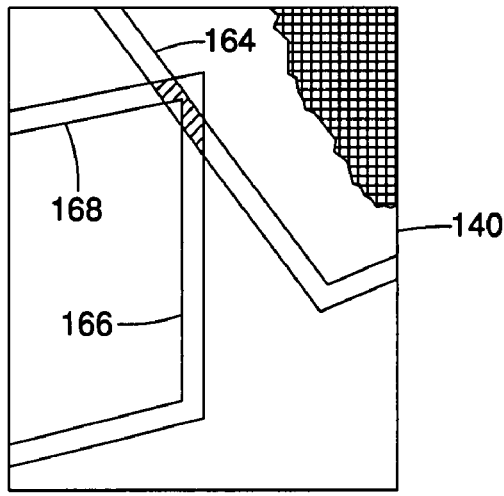
FIG. 15 is an enlarged and simplified portion of the representation shown in FIG. 14.

The process uses a digital differential analysis process that is similar to that described in a publication entitled Digital Differential Analyzer for Lines by Jon Kirwan, published at http://users.easystreet.com/jkirwan/dda.html, copyright November, 1999, where there are a series of coordinates that make up a string of lines. This publication is specifically incorporated by reference herein. If redundant grid locations are already filled in, that portion of the vector is eliminated. The grid is preferably comprised of a 16×16 bit matrix that is mapped to a 15×15 bit physical grid that lays out on a 20×40 millimeter space on an egg. The physical grid therefore contains about 65536 blocks. The grid shown in the upper right-hand corner of FIG. 15 representatively illustrates the size of blocks of the grid.

Very short vectors and point or near-point artifacts can be also removed because they are not visible when rendered. Such a process together with other processes was used to reduce the number of vectors shown in FIG. 11 from 572 vectors to 227 vectors shown in FIG. 12.

Figure 11:
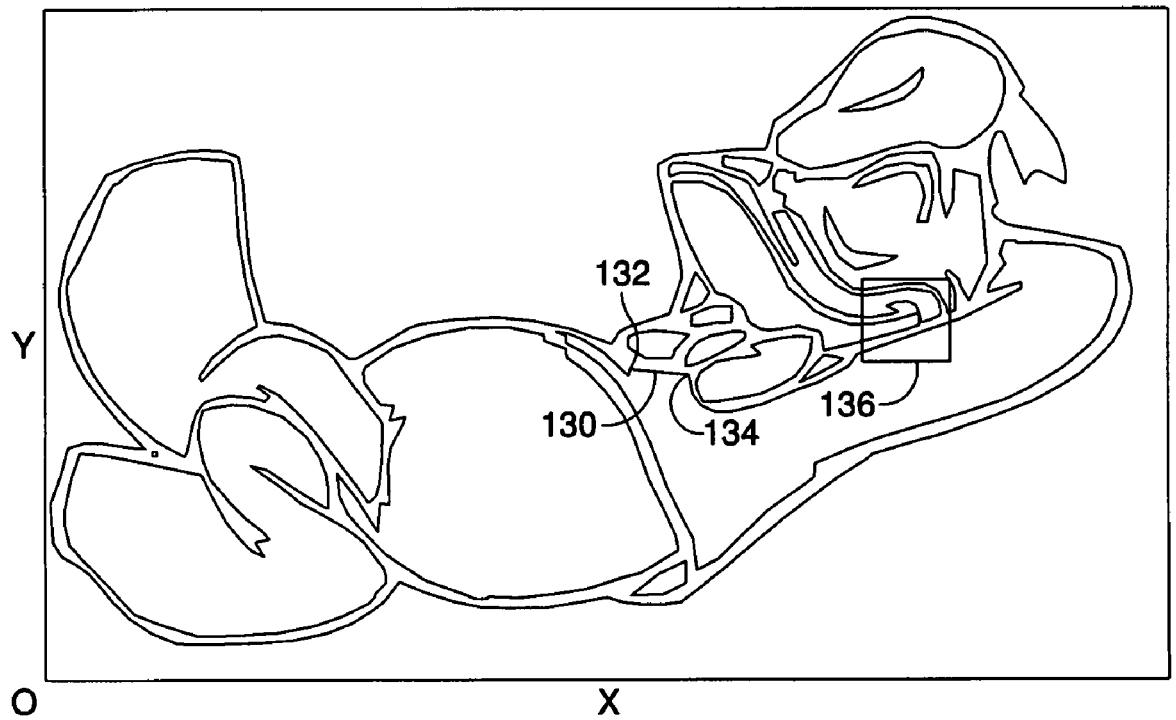
FIG. 11 is a graphic representation of a reclining Donald Duck that is made by a plurality of vectors.
Figure 12:
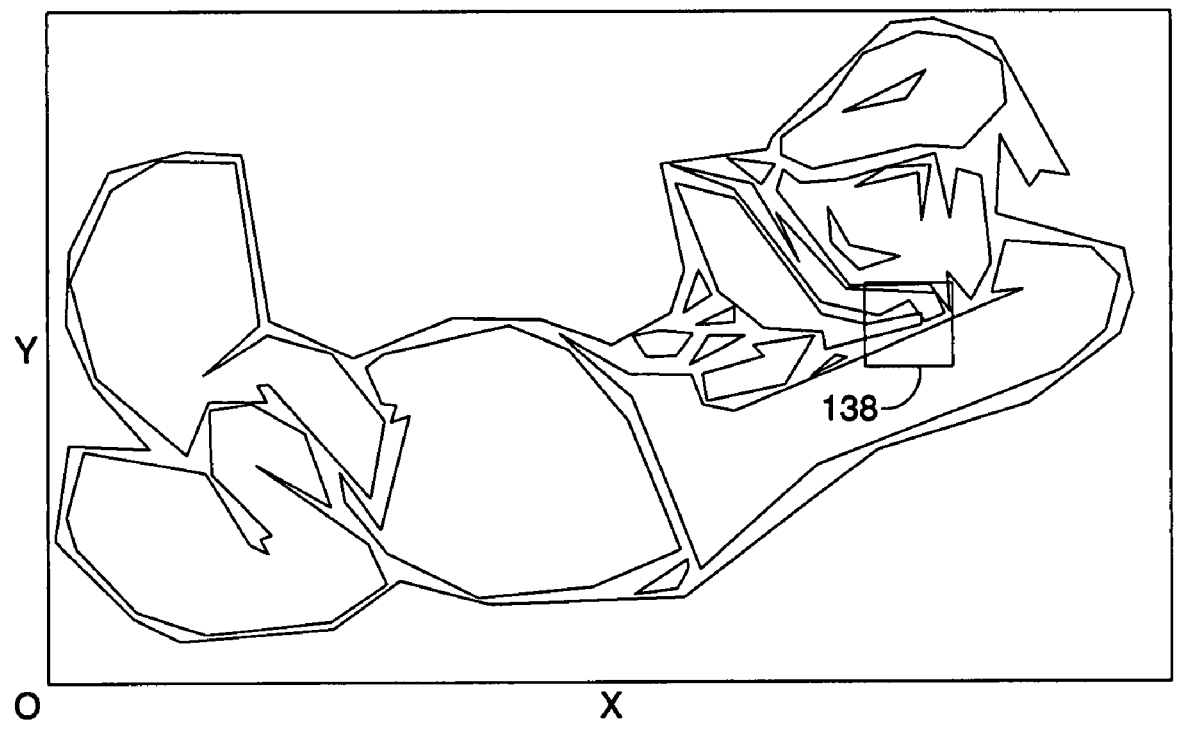
FIG. 12 is a similar view as FIG. 11, but with the number of vectors being reduced.
Figure 13:
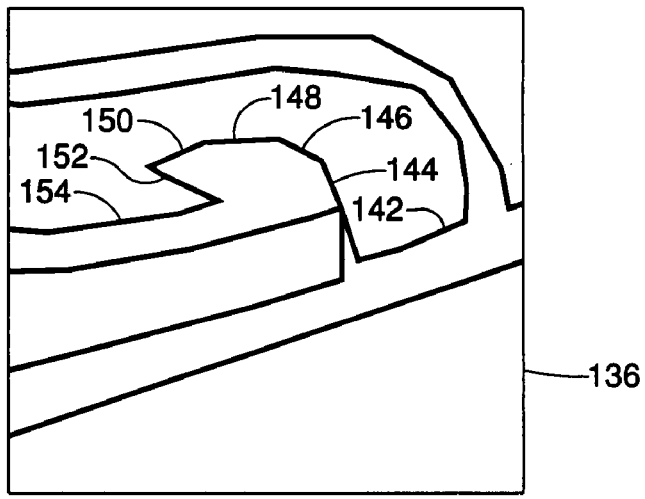
FIG. 13 is an enlargement of a portion of the representation shown in FIG. 11.
Figure 14:
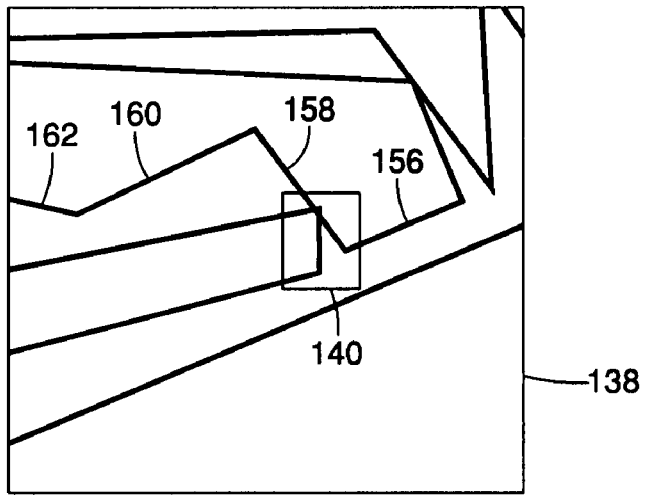
FIG. 14 is an enlargement of a portion of the representation shown in FIG. 12.

The processes are illustrated in FIGS. 11-14, wherein a portion 136 of the representation of FIG. 11 is shown in FIG. 13 that compares with a similar portion 138 of the simplified representation of FIG. 14. The lines of portion 138 from FIG. 14 are slightly different and simplified relative to the portions 136 shown in FIG. 13, and an enlargement of the box 140 of FIG. 14 is shown in FIG. 15.

An example of the vector thinning simplification is shown by comparing connected vectors 142, 144, 146, 148, 150, 152 and 154 in FIG. 13, with a simplified version comprised of vectors 156, 158, 160 and 162 shown in FIG. 14. While these two versions look relatively dissimilar in the enlarged FIGS. 13 and 14, they are quite similar in effect when viewed in the boxes 136 and 138 of FIGS. 11 and 12.

An example of the raster scanning is represented by the enlargement of box 140 from FIG. 14, which is shown in FIG. 15. The rasterization of vectors 164, 166 and 168 show that they overlap one another in the area that is crosshatched. Therefore, addresses that represent duplicates are used to turn off the laser marking units at appropriate times so that the location is only marked once.

Given that a laser etched line has a discrete width, another technique that can be used is that if two lines that are crossing or are very close together, there can be over-burn because of the width aspect of the line. Therefore, vector boundaries can be compared with other vector boundaries and thinning appropriately done. Given that it takes time to turn the laser on and off, there is a point of diminishing returns with the complexity of a vector thinning process.

The galvanometer scanning heads 80 are controlled by the RTC® PC interface boards which are programmed using a 16-bit coordinate system. To compensate for marking a moving product, that graphics are staged to the far right, i.e., when the left end of the representation of FIG. 11, to "anticipate" etching a moving egg.

This cannot be done with the 16-bit coordinate system, so it is mapped into a 15 bit physical window, which essentially halves the size of the coordinate space. A correction matrix ignores coordinates that are outside of the 15 bit space. So the graphic is positioned in virtual space so that when the egg comes into the frame, the galvanometer scanning heads 80 is moved over to the edge and starts rendering the image immediately.

This technique is necessary because the entire graphic must be sent to the galvanometer system in a coordinate system. Without the virtual mapping, it would be necessary for the entire graphic to be within the physical window before rendered could begin, which would dramatically reduce the time in which rendering could occur. This technique enables the system to render the graphic during the entire window, i.e., the entire time in which rendering can be done.

If this were completely in the real or principal coordinate system, the system cannot start rendering until the whole graphic is within the spatial window. The graphic is staged as far to the right as possible with respect to the coordinate system. So when the galvanometer scanning head 80 is to start rendering, it will move to the right and move with the egg so that when the egg comes into the real coordinate system, the galvanometer scanning head 80 can be controlled to go to a physical coordinate, i.e. an edge in the physical space so that it can start rendering the graphic when it appears in the 15 bit coordinate space.

It may be highly desirable for embodiments of the present invention to mark multiple objects with different graphical representations. In the event that eggs are being marked, it may be desired to have a carton of a dozen eggs marked with 12 different graphical representations, i.e., advertisements for 12 different products or messages. In such event, the complexity of the graphical representations may vary significantly. For a complex representation, the marking speed may have to be increased to a relative maximum to complete the entire representation. The faster marking speed will reduce the print contrast, and conversely a slower marking speed will increase the print contrast. It is desirable to have the greatest possible print contrast and therefore it is desirable to mark each graphical representation using the entire 69 or 138 millisecond time window. Since each graphical representation is contained in a separate file, the optimum marking speed for each representation is made to be part of the file, and the operating parameters of the apparatus are thereby tuned or configured for utilizing the entire time window during marking. In the example of having 12 different representations for a dozen eggs in a carton, the apparatus would likely have its operating characteristics change during the marking of each successive egg having a different representation. Such configuration flexibility optimizes the effectiveness and quality of the marking operation.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for laser marking individual objects with indicia at a marking station, said apparatus comprising:
    at least one processor configured to control laser marking of individual objects; and
    at least first and second laser marking units controlled at least in part by the at least one processor, the first and second laser marking units positioned adjacent at least one path along which the objects are conveyed, the first and second laser marking units configured to direct at least one laser beam onto the objects to mark the same with indicia as the objects pass through the marking station, wherein the at least one processor is programmed to control the plurality of laser marking units to mark the eggs in such a manner that
    for each said object, a corresponding predetermined time window exists during which the object can be marked;
    each of said first and second laser marking units is configured to mark alternate following objects as the objects pass through the marking station; and
    a first predetermined time window for marking a first object overlaps with a second predetermined time window for marking a second object so that the first and second objects are simultaneously marked in at least a common portion of the first and second predetermined time windows.

2. Apparatus as defined in claim 1 wherein each of said first and second laser marking units comprises a laser generator and a galvanometer scanning head configured to mark graphic representations according to vector coordinate information, wherein the at least one processor is configured to read digital files that define said vector coordinate information for specific graphic representations that said laser marking units mark on the objects.

3. Apparatus as defined in claim 2 wherein said digital files further define the order of marking by the laser marking unit so that downstream vectors are marked generally before upstream vectors.

4. Apparatus as defined in claim 3 wherein the order of marking vectors is determined at least to tend to minimize the distance from the end of one vector to the start of the next vector to be rendered.

5. Apparatus as defined in claim 2 wherein said digital files for specific graphic representations further define a predetermined marking speed of said galvanometer scanning head for marking said specific graphic representation.

6. Apparatus as defined in claim 5 wherein the objects are eggs, and wherein said predetermined marking speed is determined at least to produce a desired level of print contrast on eggs and is determined to be the slowest marking speed that can complete a specific graphic representation within said predetermined time window corresponding to each egg.

7. Apparatus as defined in claim 2 said predetermined conveying speed is as high as about 66 meters a minute.

8. Apparatus as defined in claim 2 wherein each of said laser generators is a Carbon Dioxide laser having up to about 70 watts of power and produces a laser beam that produces a mark on an object of about 0.3 millimeter width.

9. Apparatus as defined in claim 1 wherein the indicia marked by said first and second laser marking units comprises one or more graphic representations.

10. Apparatus as defined in claim 1 wherein said predetermined conveying speed is as high as about 66 meters per minute.

11. Apparatus as defined in claim 1 wherein said graphic representations comprise text as well as pictorial representations.

12. Apparatus for laser marking individual chicken eggs while the eggs travel along at least one path through an egg grading system, said apparatus comprising:
at least one processor for controlling the operation of said apparatus;
at least one memory for storing digital information defining various graphic representations; and
a plurality of laser marking units operatively connected to said at least one processor and configured to mark at least two of said graphic representations on eggs traveling along said at least one path, each of said laser marking units comprising
a generator for producing a laser beam at an output and
a galvanometer scanning head positioned adjacent the at least one path and configured to receive said laser beam and direct said laser beam onto the eggs as the eggs travel along the at least one path,
wherein the at least one processor is programmed to control the plurality of laser marking units to mark the eggs in such a manner that
a first predetermined time window exists for marking a first egg using a first laser marking unit,
a second predetermined time window exists for marking a second egg using a second laser marking unit, and
the first predetermined time window overlaps with the second predetermined time window so that the first and second eggs are simultaneously marked in at least a common portion of the first and second predetermined time windows.

13. Apparatus as defined in claim 12 wherein, for each of said laser marking units, a corresponding elongated support has a central opening through which a corresponding laser beam travels from a corresponding generator to a corresponding scanning head.

14. Apparatus as defined in claim 13 wherein the at least one path comprises a plurality of paths and at least three laser marking units are provided for each path of the plurality of paths.

15. Apparatus as defined in claim 14 said laser generators are elongated and are mounted in a generally vertical orientation and each produce a generally vertical laser beam at one end thereof, each of said laser marking units having at least one mirror for directing a corresponding laser beam to a corresponding scanning head.

16. Apparatus as defined in claim 12 further comprising a plurality of protective lenses on said scanning heads and a lens protection plate extending over said scanning heads and having openings directly above said lenses through which said laser beams can pass from said scanning heads to the eggs.

17. Apparatus as defined in claim 16 further comprising at least one air knife for providing a deflecting air stream over said openings for propelling matter away from said openings.

18. Apparatus as defined in claim 12 wherein said laser marking units are movable away from the at least one path.

19. Apparatus as defined in claim 12 further comprising a Germanium lens in each of said openings through which said laser beams can pass from said scanning heads to the eggs, while preventing matter from passing through said openings.

20. A method of laser marking individual objects while they travel along at least one path through a marking station at a first predetermined speed, comprising the steps of:
activating a first laser to begin marking a first object when it enters the marking station and continuing to mark the first object through a first predetermined time window within the station;
activating a second laser to begin marking a successive object when it enters the marking station and continuing to mark the successive object through a second predetermined time window within the station;
the first and second predetermined time windows overlapping with one another so that both objects are being simultaneously marked for at least a portion of the length of said time windows.

21. A method as defined in claim 20 wherein said first and second time windows generally have the same time duration.

22. A method as defined in claim 20 wherein said predetermined speed is as high as about 66 meters a minute.

23. A method as defined in claim 20 wherein said laser comprises a laser generator and a galvanometer scanning head configured to mark said objects according to vector coordinate information.

24. A method as defined in claim 20 wherein said laser is a Carbon Dioxide laser that has a maximum power of at least about 70 watts and produces a laser beam that produces a mark on an object having about a 0.3 millimeter width.

25. A method as defined in claim 20 wherein each of said first and second predetermined time windows is approximately 135 to approximately 140 milliseconds when said first predetermined speed is about 66 meters a minute.

26. A method of marking objects as defined in claim 20 wherein said objects are eggs and said marking station is positioned in association with an egg grading system.

27. A method executed by at least one processor for producing a digital file of a graphic representation that can be rendered on a moving surface by a vector based scanning laser scanning at a predetermined marking speed within a predetermined time window, comprising the steps of:
establishing a grid representing the general size of the graphic representation to be rendered;

establishing a multiplicity of vectors on said grid that illustrate the graphic representation with realistic visual fidelity;

cutting long vectors into shorter vectors where the long vectors extend at least more than approximately one third of the width of the grid;

determining the total length of vectors to be rendered and simplifying vectors if the total length cannot be rendered within said predetermined time window;

determining at least one order of rendering by the laser so that downstream vectors are rendered generally before upstream vectors; and storing in a non-transitory computer readable medium a digital file comprising vector coordinate information for the vectors to be rendered.

28. A method of producing a digital file as defined in claim 27 wherein said simplifying step comprises at least one of:

rasterizing said vectors into a matrix of bits and eliminating redundant bits; eliminating vectors that are close to other vectors if the elimination fails to affect the visual fidelity of the graphic representation;

eliminating artifacts and points that fail to affect the visual fidelity of the graphic representation.

29. A method of producing a digital file as defined in claim 28 wherein said matrix of bits contains at least 65,000 bits.

30. A method of producing a digital file as defined in claim 27 wherein said marking speed is within the range of about 400 to about 800 bits per millisecond.

31. A method of producing a digital file as defined in claim 30 wherein said file has data defining the marking speed for marking a chicken egg to produce a desired level of print contrast.

32. A method as defined in claim 31 wherein said data specifies the slowest speed that can complete the marking of a specific graphic representation within the predetermined time window.

33. A method of producing a digital file as defined in claim 27 wherein the order of rendering vectors is determined at least to tend to reduce the distance from the end of one vector to the start of the next vector to be rendered.

34. A method of producing a digital file as defined in claim 27 wherein said surface is the shell of an egg.

35. Apparatus for laser marking individual chicken eggs while the eggs travel along at least one path through an egg processing system, said apparatus comprising:

at least one processor for controlling the operation of said apparatus;

at least one memory for storing digital information defining various graphic representations; and a plurality of laser marking units operatively connected to said at least one processor and configured to mark at least two of said graphic representations on the eggs traveling along said at least one path, each of said laser marking units comprising a generator for producing a laser beam at an output and a galvanometer scanning head positioned adjacent the at least one path and configured to receive said laser beam and direct said laser beam onto the eggs as the eggs travel along the at least one path, wherein said scanning head is mounted on a support that positions said scanning head relative to the at least one path, and wherein the at least one processor is programmed to control the plurality of laser marking units to mark the eggs in such a manner that a first predetermined time window exists for marking a first egg using a first laser marking unit, a second predetermined time window exists for marking a second egg using a second laser marking unit, and the first predetermined time window overlaps with the second predetermined time window so that the first and second eggs are simultaneously marked in at least a common portion of the first and second predetermined time windows.

36. Apparatus as defined in claim 35 wherein, for each of said laser marking units, a corresponding elongated support has a central opening through which a corresponding laser beam travels from a corresponding generator to a corresponding scanning head.

37. Apparatus as defined in claim 36 wherein the at least one path comprises a plurality of paths and at least three laser marking units are provided for each path of the plurality of paths.

38. Apparatus as defined in claim 37 said laser generators are elongated and are mounted in a generally vertical orientation and produce a generally vertical laser beam at one end thereof, each of said laser marking units having at least one mirror for directing a corresponding laser beam to a corresponding scanning head.

39. Apparatus as defined in claim 35 wherein said laser marking units are movable away from the at least one path.

* * * * *

UNITED STATES PATENT AND TRADEMARK OFFICE
CERTIFICATE OF CORRECTION

| | | |
|---|---|---|
| PATENT NO. | : 8,084,712 B2 | Page 1 of 1 |
| APPLICATION NO. | : 11/725099 | |
| DATED | : December 27, 2011 | |
| INVENTOR(S) | : Michael John Griffiths et al. | |

It is certified that error appears in the above-identified patent and that said Letters Patent is hereby corrected as shown below:

On the Title page, Item (73) Assignee, "TEN Medias LLC" should read --TEN Media, LLC--

Signed and Sealed this
Eighth Day of May, 2012

David J. Kappos
*Director of the United States Patent and Trademark Office*